Sept. 11, 1956 — H. E. CIER — 2,762,768
PHOTOCHEMICAL REACTION OF HYDROCARBONS
Filed April 11, 1955
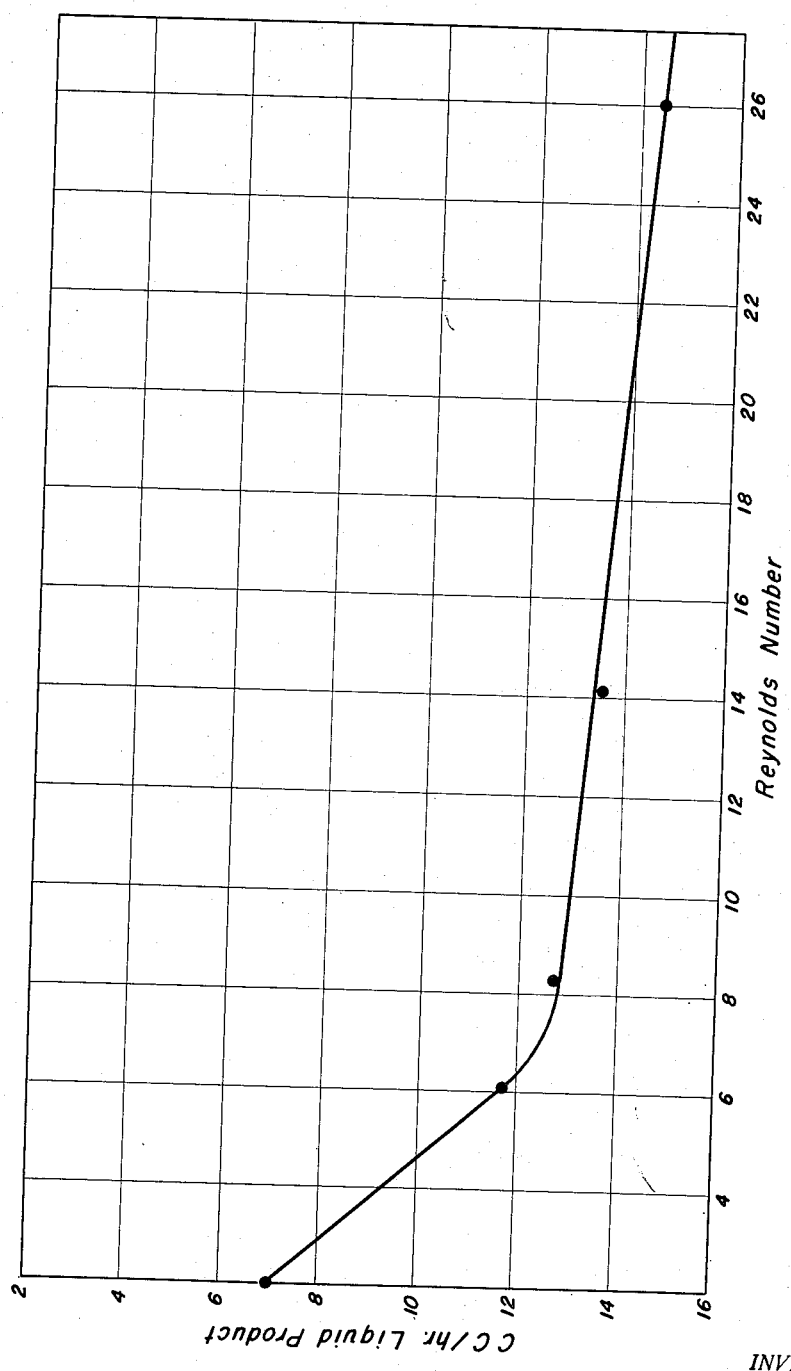
INVENTOR.
Harry E. Cier,
BY
ATTORNEY.

United States Patent Office 2,762,768
Patented Sept. 11, 1956

2,762,768

PHOTOCHEMICAL REACTION OF HYDROCARBONS

Harry E. Cier, Baytown, Tex., assignor, by mesne assignments, to Esso Research and Engineering Company, Elizabeth, N. J., a corporation of Delaware Application April 11, 1955, Serial No. 500,637

9 Claims. (Cl. 204—162)

The present invention is directed to photochemical reactions. More particularly, the invention is directed to a method for increasing the quantum efficiency of photochemical reactions of the free radical type. In its more specific aspects, the invention is directed to free radical photochemical reaction of hydrocarbons in vapor or gas phase.

In photochemical processes, the non-chain free radical reaction may be illustrated by the dimerization of a paraffin but is not restricted thereto. These reactions may be summarized as follows:

*Dimerization*

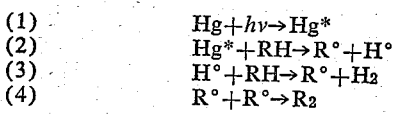

(1)      $Hg + h\nu \rightarrow Hg^*$
(2)      $Hg^* + RH \rightarrow R° + H°$
(3)      $H° + RH \rightarrow R° + H_2$
(4)      $R° + R° \rightarrow R_2$ where R is a hydrocarbon radical and $h\nu$ is a radiation of an exciting frequency having an energy content greater than the bond strength. If no other reactions were involved, the absorption of one quantum of light energy would theoretically result in, in the case of the dimerization reaction, two molecules of paraffin converted into products. Actually, these reactions do not proceed to this extent because of chain breaking, or terminating reactions. This type of reaction may be illustrated as follows:

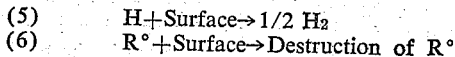

(5)      $H + Surface \rightarrow 1/2\, H_2$
(6)      $R° + Surface \rightarrow$ Destruction of $R°$ These terminating reactions are of great significance in processes of this type and in all cases greatly reduce the quantum efficiency.

It is known that hydrocarbons can be made to react by the so-called "free radical" mechanism. The formation of free radicals from a saturated hydrocarbon molecule involves the breaking of either a C—C or a C—H bond. Although the bond energies of the C—H bonds in a hydrocarbon molecule are greater than the bond energies of the C—C bonds in the molecule, it is possible to attack preferentially the C—H bonds, in a type of reaction wherein the hydrocarbon molecule collides with a metal atom which has been excited by radiant energy of a resonance frequency to a state wherein its energy is greater than the energy of the C—H bond to be broken. The energy of the C—H bond, or in other words, the amount of energy required to break a particular bond, depends primarily upon the nature of the bond, i. e. whether it is primary, secondary, or tertiary, and to a lesser extent upon the molecular weight of the hydrocarbon. In all cases it has been found that in any particular hydrocarbon molecule the energy of the primary C—H bond is the greatest, that of the secondary C—H bond less, and that of the tertiary C—H bond the least. This relationship, as well as the variation of bond strength with molecular weight, may be observed from Table I below in which the bond energies, which have been established for certain particular C—H bonds in various hydrocarbon molecules, are tabulated.

Table I

| Compound | C—H Bond | N[1] | Bond Energy in Kilocalories |
|---|---|---|---|
| Methane | Primary | 4 | 102 |
| Ethane | ----do | 6 | 97.5 |
| Propane | ----do | 2 | 90.8 |
| n-Butane | Secondary | 4 | 88 |
| Isobutane | ----do | 1 | 86.5 |
| n-Pentane | Tertiary | 6 | 88.5 |
| Isopentane | Secondary | 1 | 86 |
|  | Tertiary |  |  |

[1] N = number of hydrogens of that type (i. e. primary, secondary, tertiary) in molecule.

In non-chain free radical reactions of the type illustrated in Equations 1 to 4, the sensitizing agent is a metal which is susceptible to being excited by radiation of an exciting frequency. Metals susceptible to being excited and to catalyze the photochemical reactions such as illustrated by Equations 1 to 4 are those metals from the right-hand column of group II of the periodic table designed by Henry D. Hubbard, revised edition, 1947, W. M. Welch Manufacturing Co., Chicago, Illinois.

It has now been discovered that the quantity of liquid product of higher molecular weight than the feed may be substantially increased by employing a flow within a critical range of Reynolds number in a reaction zone while conducting photochemical reactions of the non-chain free radical type in the vapor of liquid phase.

The present invention may, therefore, be described as involving a method for conducting a photochemical reaction in the presence of a sensitizing agent susceptible to being excited by light radiation of an exciting frequency in which the quantum efficiency of the reaction is increased by maintaining in the reaction zone conditions of flow sufficient to provide therein a Reynolds number of at least about 600 and preferably in the range between about 600 and about 3000.

The invention involves reacting a hydrocarbon with itself or with another hydrocarbon which may be a hydrocarbon of the same type or of the same homologous series or one of a different type or different homologous series.

The hydrocarbon forming a feed stock of the present invention may be an aliphatic or a paraffinic hydrocarbon, such as methane, ethane, propane, normal butane, isobutane, normal pentane, isopentane, the hexanes, heptanes, octanes and the higher members of the paraffinic homologous series. Lubricating oil fractions may also be used. As a general statement it may be said that the hydrocarbon may be an aliphatic hydrocarbon and may include straight, branched, and cyclic, saturated, and unsaturated hydrocarbons. The hydrocarbon may contain up to about 50 carbon atoms. It is understood, of course, that mixtures of hydrocarbons, such as mixtures of paraffinic hydrocarbons or the naphthenic and unsaturated hydrocarbons, may be employed. Specifically, olefins, or olefins and paraffins, and the like, may be used in the reaction. It is also understood that derivatives of the aforementioned hydrocarbons may be employed as a feed stock in the present invention.

The sensitizing agent susceptible to being excited by light radiation of an exciting frequency may be any metal which meets the conditions set out below, including proper vapor pressure, light absorption characteristics, and energy content in the activated state. Whatever metal sensitizer is employed it is incorporated in the reaction mixture of hydrocarbons, and the mixture is subjected to radiant energy containing frequencies which are capable of energizing the metal sensitizer. In selecting a metal sensitizer and a source of radiant energy for the reaction the following conditions must be met:

(A) The vapor pressure of the metal employed as a sensitizer must be sufficient to insure that metal vapor is present in the hydrocarbon mixture in a concentration sufficient to absorb the activating light efficiently and to an extent that will permit rapid reaction to take place; conveniently, this vapor pressure is at least 0.001 mm. of mercury at a temperature below about 650° F.

(B) The radiant energy must be of a frequency that can be absorbed by the metallic sensitizer in its ground state in the hydrocarbon mixture. This frequency must correspond to at least one of the resonance lines of the metal sensitizer.

(C) The sum of the energy of the resonance frequency absorbed by the metal sensitizer and of the energy of the metal-hydrogen bond must correspond to an energy content equal to or in excess of that required to rupture one of the paraffin C—H bonds.

While a number of metal sensitizing agents will fill some of the foregoing requirements, the preferred metal sensitizing agents in carrying out my invention are the metals of subgroup B of group II of the periodic table, supra, namely mercury, cadmium and zinc. While either of these metals may be employed in my process, mercury will be preferred because of its availability, vapor pressure, activation energy, and other peculiar properties.

In order to illustrate the resonance line of the metallic sensitizers suitable for practice in the present invention, the following table is presented:

Table II

| Element | Resonance Lines, A. |
|---|---|
| Hg | 2537 / 1850 |
| Cd | 3261 / 2289 |
| Zn | 3076 / 2139 |

The reaction may be conducted at a temperature in the range from about 80° to 650° F. and pressures may be substantially atmospheric and ranging upwardly therefrom. The temperature and pressure within the range given will be selected to provide a vapor phase and/or for maintenance of a vaporous or gaseous phase.

The process of the present invention is not limited to any particular type of equipment. The reaction has been carried out satisfactorily in an annular reactor consisting of a cylindrical outer Pyrex jacket provided with an inlet at one end and an outlet at the other end, the inner cylinder emanating light of the desired wave length. For example, when it is desired to employ mercury as the metallic sensitizer, a mercury vapor lamp emanating light of 2537' A. wave length is inserted as concentric inner cylinder in the Pyrex jacket. When employing mercury as a sensitizer, the lamp should be operated in such a manner that an unreversed 2537 A. line is obtained. A satisfactory lamp for such a purpose is, for example, the General Electric 15 watt "T-8 Germicidal Lamp," or a lamp such as described in U. S. Patent 2,473,642 to Found et al.

When cadmium is used as the metallic sensitizer, a cadmium lamp may be employed. The reactor jacket may be surrounded with a suitable heating means such as an electric heater or a furnace. When the feed stock of the present invention is a hydrocarbon which is to be reacted with another hydrocarbon, such as one paraffinic hydrocarbon with another or with an olefin, the paraffinic hydrocarbon feed is vaporized and introduced into the jacket through the inlet, conditions of flow being adjusted in the jacket such as a Reynolds number in the range from about 600 to about 3000 is employed. Operating at flow conditions within this range of Reynolds number gives unexpectedly good results when a gas or vapor phase reaction is conducted. The products of reaction are withdrawn through the outlet in carrying out a mercury sensitized reaction. A satisfactory method of maintaining the mercury sensitizer in the reaction zone is to place a small amount of metallic mercury into the reaction jacket prior to the beginning of the reaction. Other satisfactory methods of introducing metal sensitizers are well known. For example, a carrier stream, consisting of the vaporized hydrocarbon feed, or a portion thereof, or an inert gas, such as nitrogen, may be passed through a vessel containing the metal sensitizer in the liquid or vapor state prior to passing the carrier stream into the reaction zone.

In carrying out the practice of the present invention, it is desirable that substantially pure feed stocks be employed. By pure feed stock is not meant that the feed should consist solely of the hydrocarbons being reacted. In other words, other materials may be present but the other materials which may be present should not be a material which is highly reactive with the hydrocarbon to the extent of producing undesirable products. Particularly, it is not disadvantageous for the feed stream to contain compounds or hydrocarbons which are considerably less reactive at the reaction conditions employed than the reactants whose product is desired. Attention, however, should be paid to the exclusion of impurities which may react with the feed or sensitizing agent to produce undesirable contaminating compounds. In fact, water vapor, in low concentration, may not be harmful to a mercury sensitizer but it may oxidize cadmium. Reactive compounds other than the hydrocarbons desired to react will cause side reactions to take place which may form less desirable product; however, such compounds may not cause the sensitizer to deteriorate.

The effluent leaving the reactor in which a process according to my invention is carried out may contain unconverted feed hydrocarbons as well as the product. The total effluent may be subjected to condensation to recover the feed and product in the liquid phase, and hydrogen and other non-condensibles in the gas phase. A part of the total liquid effluent may be recycled to the reactor to increase the yield of product from the original feed, and a part of all of the total liquid effluent may be subjected to fractional distillation in order to recover the desired products in substantially pure form.

Since maintenance of desired flow conditions in the reaction zone may be such that appreciable quantities of the metal sensitizer are carried out of the reactor in the product stream, then it may be desirable to insert a device to recover the metal sensitizer from the reactor effluent. This may be in the form of a condenser maintained at a low temperature or, in the case where mercury is the sensitizer metal, it may be a bed of a metal with which mercury may be amalgamated such, for example, as zinc or copper.

In order to illustrate the invention further, several runs were made charging a 50–50 molar mixture of isobutane and isopentane in a vaporous condition to a reaction zone similar to that described before with the exception that a 30-watt germicidal lamp was used. The feed rate during several operations was varied over a four-fold range with all other conditions, including radiation intensity, being held constant. The feed rate varied from 50 volumes per minute to 200 volmes per minute with one run being made with 100 volumes per minute. The moles of liquid product of higher molecular weight than the feed produced during a given period for 50 volumes per minute was 0.027; for 100 volumes per minute the amount was 0.028; and for 200 volumes per minute it was 0.032.

From these data it will be observed that the number of moles formed increased as the velocity of flow was increased. Since the quantum input to the reaction remained constant, it is clear that the quantum efficiency increased as the velocity increased.

To investigate this point further, a higher powered reaction chamber was constructed including a lamp which had a power consumption of 800 watts, 25 times as powerful as the 30-watt lamp used in the previous runs.

Employing the higher powered lamp a number of runs were made employing a vaporized butane feed stock consisting of 98% n-butane and 2% of propane and isobutane to produce a product containing hydrocarbons of higher molecular weight. The conditions of flow were adjusted to vary the Reynolds number in the reaction zone from 200 to 2600. The results of these runs are shown in the following table.

*Table III*

| Feed Rate, Gm./Hr. | Reynolds No. | Liquid Product, Vol./Hr. | Conversion of Butane Feed to Liquid, Mol Percent | Kilowatts Useful Energy/lb. of Product |
|---|---|---|---|---|
| 60.7 | 200 | 6.9 | 11.0 | 6.68 |
| 187.2 | 620 | 11.7 | 4.8 | 3.89 |
| 252.0 | 830 | 12.7 | 3.9 | 3.59 |
| 431.8 | 1,410 | 13.5 | 2.5 | 3.37 |
| 793.3 | 2,600 | 14.4 | 1.5 | 3.15 |

From these runs it will be observed that the quantity of liquid product has been more than doubled at a velocity of flow at above about 600 Reynolds number but conversions of butane to liquid are decreasing at the higher rates. Above about 600 Reynolds number, the rate of increase in liquid product produced is substantially uniform. Above about 3000 Reynolds number the percentage conversion of feed to useful liquid product falls to a point where recycle becomes limiting and recovery of liquid product from the gaseous or vaporous phase would be required. The increase in the quantity of the product has been achieved solely by increasing the velocity. No change in the energy input into the reaction system or other conditions were employed. Since, as shown before, the extent of the photochemical reaction is dependent upon (1) the amount of energy supplied and (2) the extent of terminating (or wall) reactions, the beneficial effect of the increased velocity must result, as shown by the foregoing data, from the influence of the terminating reactions.

In order to illustrate the critical feature of the velocity of flow in the reaction zone, the data in Table III are plotted in the sole figure of the drawing in which the volumes of product per hour were plotted against the Reynolds number. It will be observed that there is a definite break or discontinuity in this curve at about 600 Reynolds number.

It is apparent from the foregoing data that velocity of flow has a beneficial effect on the quantum efficiency of a photochemical reaction in gaseous or vaporous phase reaction of the type illustrated. This is an entirely new and unexpected result. It is possible to achieve these beneficial effects by conducting the reaction under conditions of mixing in the reaction zone so that a higher quantum efficiency may be achieved as shown. This may be accomplished by flowing one or more or all of the reactants under high flow rates or by providing in the reaction zone a series of orifice plates to achieve mixing. Injection of feed through small jet nozzles into the reaction zone may also be used to provide the desired velocity to give the required Reynolds number. The same beneficial effect may be achieved by high recycle rates of the product or of unreacted materials in the product.

This application is a continuation-in-part of Serial No. 237,663, filed July 19, 1951, now abandoned.

The nature and objects of the present invention having been fully described and illustrated, what I wish to claim as new and useful and to secure by Letters Patent is:

1. A method for reacting a hydrocarbon feed in the vapor phase to form a liquid product comprising a hydrocarbon of higher molecular weight than the feed hydrocarbon which comprises exposing to light radiation of an exciting frequency at a reaction temperature in the range between 80° and 650° F. in a reaction zone at a constant energy input a vaporous mixture consisting of said hydrocarbon feed and a metal sensitizing agent susceptible to being excited by said radiation selected from the group consisting of mercury, zinc, and cadmium, the mixture in said reaction zone being maintained at a velocity of flow in the range from about 600 to about 3000 Reynolds number whereby the quantity of liquid product obtained is doubled over that obtainable at lower velocities.

2. A method in accordance with claim 1 in which the feed hydrocarbon is a paraffinic hydrocarbon.

3. A method in accordance with claim 1 in which the feed hydrocarbon is a mixture of isobutane and isopentane.

4. A method in accordance with claim in which the feed hydrocarbon comprises normal butane.

5. A method in accordance with claim 1 in which the feed hydrocarbon is an aliphatic hydrocarbon.

6. A method in accordance with claim 1 in which the metal sensitizing agent is mercury.

7. A method in accordance with claim 1 in which the metal sensitizing agent is zinc.

8. A method in accordance with claim 1 in which the metal sensitizing agent is cadmium.

9. A method for reacting a paraffinic hydrocarbon feed in the vapor phase to form a liquid product comprising hydrocarbon of higher molecular weight than the feed hydrocarbon which comprises exposing to light radiation of an exciting frequency at a reaction temperature in the range between 80° and 650° F. in a reaction zone at a constant energy input a vaporous mixture consisting of said hydrocarbon feed and mercury as a metal sensitizing agent susceptible to being excited by said radiation, the mixture in said reaction zone being maintained at a velocity of flow in the range from about 600 to about 3000 Reynolds number whereby the quantity of liquid product obtained is doubled over that obtainable at lower velocities.

References Cited in the file of this patent

UNITED STATES PATENTS

| | | |
|---|---|---|
| 1,746,168 | Taylor | Feb. 4, 1930 |
| 2,528,320 | Roberts et al. | Oct. 31, 1950 |
| 2,636,853 | Franklin | Apr. 28, 1953 |
| 2,640,023 | Cier | May 26, 1953 |
| 2,657,985 | Schutze et al. | Nov. 3, 1953 |